United States Patent
Schulenburg (10) Patent No.: US 8,368,567 B2
(45) Date of Patent: Feb. 5, 2013

(54) CODEPAGE-INDEPENDENT BINARY ENCODING METHOD

(75) Inventor: Thomas Schulenburg, Neulussheim (DE)

(73) Assignee: SAP AG, Walldorf (DE)

( * ) Notice: Subject to any disclaimer, the term of this patent is extended or adjusted under 35 U.S.C. 154(b) by 348 days.

(21) Appl. No.: 12/846,484

(22) Filed: Jul. 29, 2010

(65) Prior Publication Data

US 2012/0030375 A1    Feb. 2, 2012

(51) Int. Cl.
*H03M 7/00*    (2006.01)
(52) U.S. Cl. .......................................... 341/50; 709/246
(58) Field of Classification Search ................ 341/50; 709/246, 217, 202, 203; 707/10, 104.1, 1, 707/2, 3, 4; 704/8
See application file for complete search history.

(56) References Cited

U.S. PATENT DOCUMENTS 6,643,652 B2 *   11/2003   Helgeson et al. ..................... 1/1

\* cited by examiner

*Primary Examiner* — Joseph Lauture (57) ABSTRACT

A method of processing binary data for transmission from a first computing system to one or more other computing systems within a character-based data file is provided. The method comprises receiving, at the first computing system, a binary data string to be stored within the character-based data file. At least a portion of the binary data string represents data other than character data. The method further comprises encoding, using an encoding module of the first computing system the binary data string using a codepage-independent encoding scheme. The encoding module is implemented using instructions that are executable by one or more processors and stored in one or more computer-readable media. The method further comprises storing the encoded binary data string in one or more of a plurality of data segments of the character-based data file. The character-based data file is configured such that all data stored in the plurality of data segments is indicated as representing character data.

20 Claims, 6 Drawing Sheets

CODEPAGE-INDEPENDENT BINARY ENCODING METHOD

BACKGROUND

The present disclosure relates generally to the field of computing systems. More particularly, the present disclosure relates to the transmission of data between two or more computing systems.

Users of computing systems often have a need to share data between two or more systems. For example, in a business environment, employees of a company may share data relating to the company (e.g., sales figures) between two networked computing systems. In some cases, data may be conveyed between the systems in a data file (e.g., document, spreadsheet, presentation, etc.) that serves as a container for one or more strings of characters.

The different systems sending and/or receiving the data files may be configured to interpret the data contained in a data file using codepages. The codepages determine the binary or byte values that correspond to each character contained in the data file. Different codepages correspond to characters used in different languages (e.g., English, Chinese, Russian, etc.), different systems (e.g., PC, Macintosh, etc.), etc. In some instances, the codepages on the sending and receiving systems are identical, and the sending and receiving systems interpret the characters contained in the data file the same way. In other instances, the codepages on the sending and receiving systems may be different, and one or more of the characters may be interpreted differently on the receiving system than on the sending system. Accordingly, differences in codepages may result in a data mismatch between the data file sent from the sending system and the data file received at the receiving system.

SUMMARY

One embodiment of the disclosure relates to method of processing binary data for transmission from a first computing system to one or more other computing systems within a character-based data file. The method comprises receiving, at the first computing system, a binary data string to be stored within the character-based data file. At least a portion of the binary data string represents data other than character data. The method further comprises encoding, using an encoding module of the first computing system the binary data string using a codepage-independent encoding scheme. The encoding module is implemented using instructions that are executable by one or more processors and stored in one or more computer-readable media. The method further comprises storing the encoded binary data string in one or more of a plurality of data segments of the character-based data file. The character-based data file is configured such that all data stored in the plurality of data segments is indicated as representing character data.

Another embodiment of the disclosure relates to a system for processing binary data received at a computing system within a character-based data file. The system comprises one or more processors and one or more computer-readable media having instructions stored thereon that executable by the one or more processors to implement a method. The method comprises receiving the character-based data file. The character-based file has a plurality of data segments. The character-based data file is configured such that all data stored in the plurality of data segments is interpreted by the computing system to represent character data. The method further comprises retrieving an encoded binary data string from at least one of the plurality of data segments. The encoded binary data string is encoded using a codepage-independent encoding scheme. The method further comprises decoding the encoded binary data string using the codepage-independent encoding scheme. At least a portion of the unencoded binary data string represents data other than character data.

Yet another embodiment of the disclosure relates to a program product comprising one or more non-transitory computer-readable media having instructions stored thereon. The instructions are executable by one or more processors to implement a method of processing binary data for transmission from a first computing system to a second computing system within a character-based data file. The method comprises receiving a binary data string to be stored within the character-based data file. At least a portion of the binary data string represents data other than character data. The method further comprises encoding the binary data string using a Base64 encoding scheme. The method further comprises separating the Base64-encoded binary data string into a plurality of Base64-encoded binary data substrings based on a maximum length associated with each of a plurality of data segments of the character-based data file. The method further comprises storing each Base64-encoded binary data substring in one of the data segments. The character-based data file is configured such that all data stored in the plurality of data segments is indicated as representing character data. Each of the plurality of data segments includes a segment type configured to identify a format of the data segment.

DETAILED DESCRIPTION

Referring generally to the figures, methods and program products for transmitting binary data of arbitrary length between two or more computing systems in a character-based data file are provided. The character-based data file may be a data file in which all data is interpreted (e.g., by a processor of a computing system) as character data. Characters, as discussed herein, may include a representation (e.g., digital representation) of a letter (e.g., a, b, c, etc.), computing code (e.g., end-of-line code, tab code, etc.) or any other symbol included as part of a character set utilized by a computing system, operating system, character encoding scheme, etc. The binary data that a user wishes to transmit within the character-based data file may be encoded using a codepage-independent encoding scheme. The encoded binary data may then be stored in one or more data segments of the character-based data file, and the character-based data file may be sent to a receiving system. The receiving system may retrieve the encoded binary data from the received character-based data file. The receiving system may then decode the encoded binary data using the codepage-independent encoding scheme to recover the original binary data.

Figure 1:
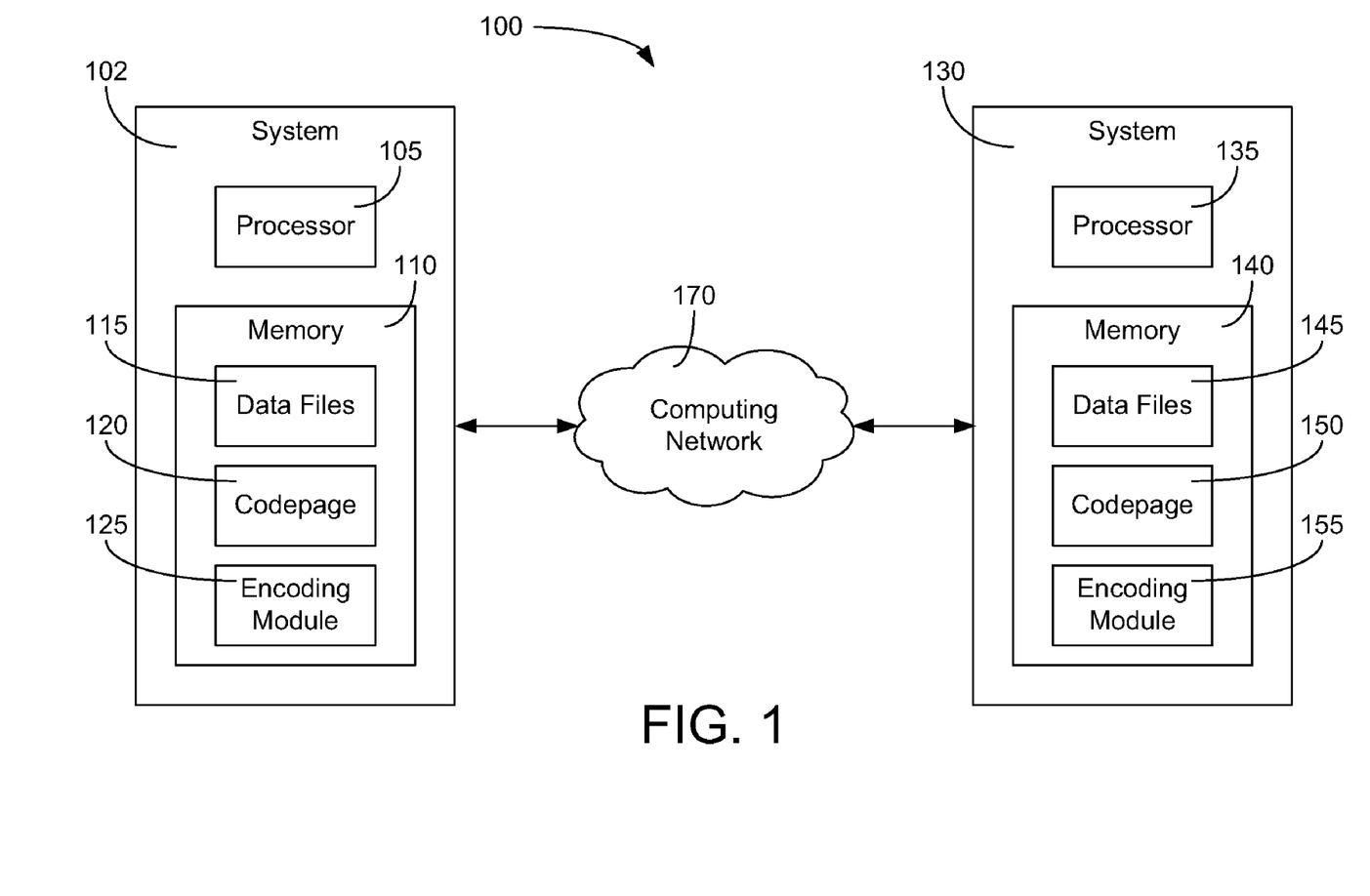
FIG. 1 is a block diagram of a system for transmitting data between two computing systems according to an exemplary embodiment.

Referring now to FIG. 1, a block diagram of a system 100 that may be used to transmit data between two computing systems 102 and 130 is shown according to an exemplary embodiment. Computing systems 102 and 130 are configured to share data over a computing network 170. In various embodiments, computing systems 102 and 130 may be configured to share various types and/or formats of data files over computing network 170, such as word processing documents, spreadsheets, presentations, electronic data interchange ("EDI") documents and/or data files, and/or other types of data files and/or data containers. Further, in various embodiments, the data files shared by computing systems 102 and 130 over computing network 170 may contain personal data (e.g., works of authorship, personal finance data, etc.), business data (e.g., sales data, human resources data, productivity data, etc.), or any other type of data.

Computing systems 102 and 130 include at least one processor (processors 105 and 135, respectively) and at least one computer-readable medium (memories 110 and 140, respectively). Memory 110 and/or memory 140 may contain one or more data files 115 and/or 145. A user of computing system 102 and/or 130 may desire to send a file from one computing system to another via network 170. For example, a user of system 102 may wish to send one of data files 115 to system 130. In some embodiments, the file the user wishes to send may contain textual and/or character data (e.g., character strings). The file may contain one or more data segments configured to store one or more strings of characters. In some embodiments, all data (e.g., binary strings, bytes, etc.) associated with each of the data segments may directly represent, be indicated as representing, and/or be interpreted (e.g., by a processor of a computing system) as character data. In such embodiments, every bit of each binary string representing a data segment may represent character data. In one exemplary embodiment, each character may be represented by one byte (i.e., eight bits) in a one-to-one format such that each byte in a binary string representing a data segment directly represents a single character stored or contained in the data segment. In other embodiments, each character may be represented by one or more bytes (e.g., Unicode). In some embodiments, the length of the data representing each character may vary based on an encoding type (e.g., UTF-8, UTF-16, etc.). In some embodiments, each data segment may be limited to a predefined number of characters and/or bytes (e.g., 1000 characters, 1000 bytes, etc.). In some embodiments, each data segment may include a segment type that may be stored in a header of the segment. The segment type may identify a format, structure, and/or type of the data contained in the segment. In some embodiments, one or more segment types may be defined by a user. In one embodiment, the format of the file may be the Intermediate Document (IDoc) format created by SAP, based in Walldorf, Germany.

To send the file from system 102 to system 130, the file may be interpreted or translated using codepages 120 and/or 150. For example, the data segments may be represented by a particular set of bits or bytes (e.g., one or more particular binary strings) in system 102 according to its codepage 120. Once the file is received by system 130, the binary string(s) representing the data segments is translated into character strings according to codepage 150 of system 130. If codepages 120 and 150 are not the same codepages, it is possible that one or more characters in the character strings may be translated incorrectly at system 130.

Figure 2A:
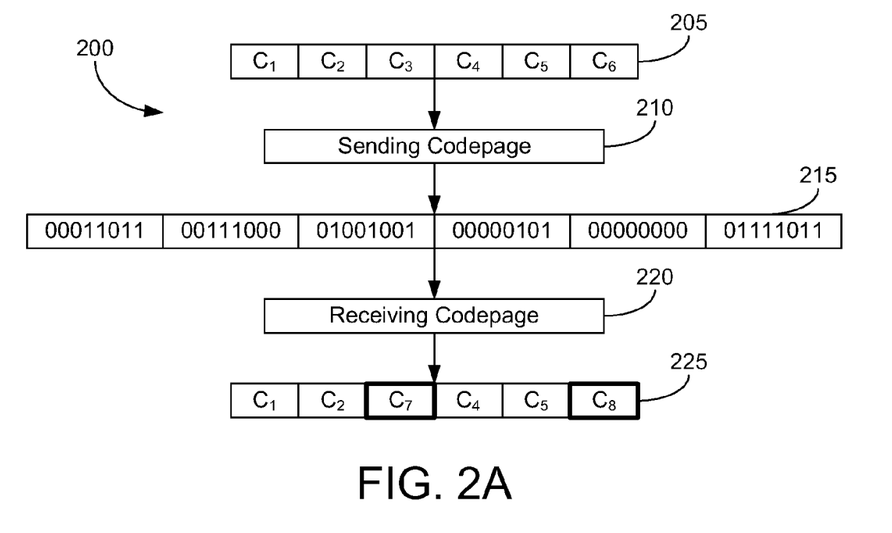
FIG. 2A is a data flow diagram illustrating the transmission of data between two computing systems having different codepages according to an exemplary embodiment.

Referring now to FIG. 2A, a diagram of a data flow process 200 illustrating the transmission of data between two computing systems having different codepages is shown according to an exemplary embodiment. In process 200, a sending computing system retrieves a data file to be sent, including a data segment, from memory (step 205). The data segment is interpreted as representing a string of six characters, $C_1$ through $C_6$. The data segment is interpreted in accordance with the codepage of the sending system (step 210) and represented as a binary string (step 215). The data file is then sent to the receiving system.

The receiving system receives the data file, including the data segment represented as the binary string. The receiving system translates the binary string according to its own codepage of the receiving system, which is different from the codepage of the sending system (step 220) and determines the final received data segment (step 225). Some binary values (e.g., bytes) represent the same characters under the codepage of the sending system as under the codepage of the receiving system. Accordingly, some characters ($C_1$, $C_2$, $C_4$, and $C_5$) are interpreted correctly in the receiving system. Other byte values included in the binary string represent different characters under the codepage of the receiving system than under the codepage of the sending system. Those portions of the binary string (representing characters $C_3$ and $C_6$ under the codepage of the sending system) are not interpreted correctly and instead are translated into different characters $C_7$ and $C_8$. Therefore, in this example, the character string $C_1C_2C_3C_4C_5C_6$ sent by the sending system is incorrectly interpreted as the character string $C_1C_2C_7C_4C_5C_8$ in the receiving system due to differences between the codepages.

Figure 2B:
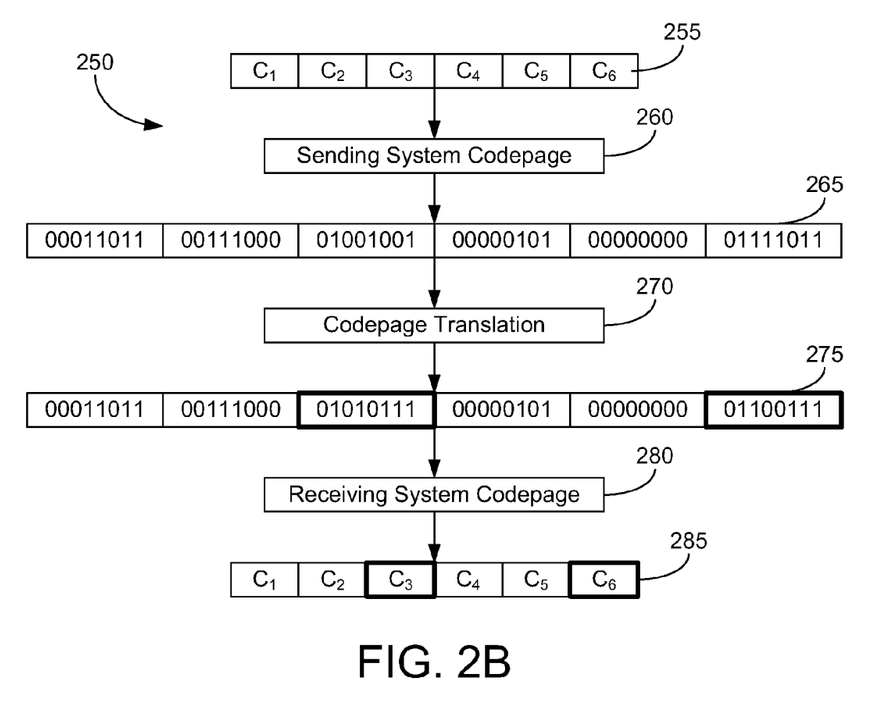
FIG. 2B is a data flow diagram illustrating the transmission of data between two computing systems with the inclusion of a codepage translation step according to an exemplary embodiment.

One solution that may be used to address the difference between codepages in sending and receiving systems is to use codepage matching. Referring now to FIG. 2B, a diagram of a data flow process 250 illustrating the transmission of data between two computing systems having different codepages is shown according to another exemplary embodiment. Process 250 utilizes a codepage matching step to account for differences between the codepages of the sending and receiving systems. In process 250, the sending system retrieves a data file to be sent, including a data segment, from memory (step 255). The retrieved data segment in this example is identical to the data segment retrieved at step 205 of process 200 and includes the same character string $C_1C_2C_3C_4C_5C_6$. The data segment is interpreted in accordance with a codepage of the sending system (step 260) and represented as a binary string (step 265). The data file is sent to the receiving system.

Before the binary string is interpreted by the receiving system in accordance with its own codepage, the binary string is translated using a codepage matching module (step 270). The codepage matching module has knowledge of the differences between the codepage of the sending system and the codepage of the receiving system. In the binary string received from the sending system, the codepage matching module determines that the codepage of the receiving system represents the characters $C_3$ and $C_6$ using different byte values or binary strings than the codepage of the sending system. The codepage matching module determines that the character $C_3$, represented by the binary string "01001001" in the codepage of the sending system, is represented by the binary string "01010111" in the codepage of the receiving system. The codepage matching module also determines that the character $C_6$, represented by the binary string "01111011" in the codepage of the sending system, is represented by the binary string "01100111" in the codepage of the receiving system. The codepage matching module then creates a new receiving binary string by changing these two bytes of the received binary string to correspond to the codepage of the receiving system (step 275). In various embodiments, part or all of the codepage matching module may reside on the sending system, the receiving system, or on another intervening system connected to the computing network.

The receiving system then translates the receiving binary string using its codepage (step 280) and determines the final data segment (step 285). Because the differences between the codepages have been accounted for by the codepage matching module at step 270, the final character string received at the receiving system is the same as the character string sent from the sending system, $C_1C_2C_3C_4C_5C_6$. However, because of the differences in the codepages and the manner in which the systems account for the differences (i.e., changing the binary string using the codepage matching module) the binary strings representing the character strings are different on the sending system and the receiving system. Accordingly, the data segments may need to be re-matched each time the data segments are sent to a new system (e.g., having a different codepage from the sending system).

In some instances, the codepage matching module may determine that one or more characters being sent by the sending system cannot be represented in the codepage of the receiving system. In some embodiments, the codepage matching module may be configured to detect an exception in such instances. The codepage matching module may be configured to abort the conversion and signal an error, convert all characters that cannot be matched to a default character (e.g., '#'), ignore the exception, or perform some other task in response to the exception.

Referring again to FIG. 1, a user may wish to transmit non-character binary data (i.e., in which at least a portion of the data does not represent characters) within a character-based data file. The user may wish to store the non-character binary data in a data segment of the character-based data file and transmit the non-character binary data as part of the file. However, all data in the character-based data file may be interpreted as character data (i.e., data representing characters), including the non-character binary data. Accordingly, if the data segments of the character-based data file are run through a codepage matching module to ensure the character data is interpreted correctly in the receiving system, some portions of the non-character binary data may be altered.

Systems 102 and 130 may be configured to avoid problems related to differences between codepages of various systems by encoding the non-character binary data using a codepage-independent encoding scheme. Systems 102 and 130 each include an encoding module (encoding modules 125 and 155, respectively) configured to encode and/or decode data using a codepage-independent encoding scheme. The encoding scheme utilized by encoding modules 125 and 155 may be an encoding scheme that utilizes characters that are represented using the same byte values and/or binary strings in most or all codepages. The encoding scheme may also be configured to account for the endianness (e.g., the ordering of bits within a byte of data, bytes within a word, such as a 16-bit, 32-bit or 64-bit word, of data, etc.) of different processor architectures and/or operating systems. For example, the encoding scheme may be configured to account for big-endian systems, wherein the most significant bit and/or byte occurs first, little-endian systems, wherein the least significant bit and/or byte occurs first, mixed-endian systems, etc. Accordingly, data encoded under the encoding scheme may be represented by the same binary string under most or all systems and/or codepages.

In some embodiments, the encoding scheme utilized by encoding modules 125 and/or 155 may be a Base64 encoding scheme. Base64 encoding schemes utilize sixty-four characters that are represented as the same bit and/or byte values in most codepages. Base64-encoded characters represent six bits of unencoded (e.g., binary) data. In some embodiments, a string or raw (e.g., unencoded) data may be split into six-bit tuples (e.g., three bytes of raw data may be split into four six-bit tuples) that are then mapped to Base64 characters (e.g., using a Base64 index table). Encoded data (e.g., an encoded binary string) representing the Base64-encoded characters may be determined according to a character encoding scheme (e.g., codepage, ASCII table, etc.).

In various embodiments, the number of bits used to represent each Base64-encoded character may vary. In some embodiments, the number of bits used to represent each Base64-encoded character may depend upon the character encoding scheme of the system. In some embodiments (e.g., non-Unicode systems), each Base64-encoded character may be represented by a single byte. In other embodiments (e.g., Unicode systems), the number of bits used to represent each Base64-encoded character may vary based on the encoding used (e.g., UTF-8, UTF-16, etc.).

Examples of Base64 encoding schemes that may be utilized by encoding modules 125 and/or 155 include, but are not limited to, schemes utilized and/or described in the standards that govern Privacy-Enhanced Mail ("PEM"), Multipurpose Internet Mail Extensions ("MIME"), UTF-7, UTF-8, UTF-16, OpenPGP, RFC 3548, RFC 4648, etc. The present disclosure focuses on the use of Base64 as the encoding scheme; however, in other embodiments, other encoding schemes and/or representations (e.g., Base32, hexadecimal, etc.) may be used to transmit data between computing systems.

To accurately transmit data from system 102 to system 130, system 102 may be configured to encode non-character binary data using a Base64 encoding scheme applied by encoding module 125. The Base64-encoded binary data may then be stored in one or more of the data segments of the character-based data file. The character-based data file may then be sent to a receiving system. The data segments of the character-based data file may be put through a codepage-matching process (e.g., in the transmitting system, the receiving system, and/or in another intervening system). The Base64-encoded non-character binary data should not be changed by such a codepage-matching process because the Base64 characters associated with the encoded binary data should be represented by the same binary and/or byte values in codepages 120 and 150. Once the character-based data file is received at system 130, system 130 may retrieve the Base64-encoded binary data from the one or more data segments. The Base64-encoded binary data may be decoded using encoding module 155 and the original non-character binary data may be recovered.

In some embodiments, one or both of the sending and receiving systems may not utilize a codepage but instead may utilize a character encoding scheme that does not use codepages (e.g., a Unicode scheme, such as UTF-8, UTF-16, CESU-8, etc.). For example, a sending system may utilize a codepage and a receiving system may utilize UTF-16 encoding. In such an embodiment, a matching module may match the codepage of the sending system to the UTF-16 encoding scheme of the receiving system (under which a single character represented by a single byte under the codepage of the sending system may be represented by two bytes in the receiving system). The encoding module may be configured to map the single character back to the same single byte in which it was represented in the sending system using binary semantics.

In various embodiments, non-character binary data of any arbitrary length may be transmitted in a character-based data file. In some embodiments, the data segments of a character-based data file may be limited to a maximum memory space and/or number of bits or bytes (e.g., 1,000 bytes). In such embodiments, non-character binary data may be split amongst multiple data segments of the character-based data file. In one embodiment, system 102 may encode the binary data string into a Base64-encoded binary string using encoding module 125. If the Base64-encoded binary string does not exceed the maximum length for a data segment, the Base64-encoded binary string may be stored in a single data segment. If the Base64-encoded binary string exceeds the maximum length for a data segment, the Base64-encoded binary string may be split among multiple data segments. For example, if a particular Base64-encoded binary string occupies 4,500 bytes and the maximum length of a data segment is 1,000 bytes, the Base64-encoded binary string may be stored across five data segments. In some embodiments, the Base64-encoded binary string may be split evenly across the data segments (e.g., 900 bytes per data segment). In other embodiments, the Base64-encoded binary string may be split into multiple strings of the maximum length and one smaller string (e.g., four 1,000 byte strings and one 500 byte string). Once system 130 receives the character-based data file, system 130 may retrieve the separate segments of the Base64-encoded binary string from the data segments and concatenate them together (e.g., based on control or other data in the character-based data file). The full Base64-encoded binary string may then be decoded using encoding module 155 to retrieve the original non-character binary string.

Figure 3A:
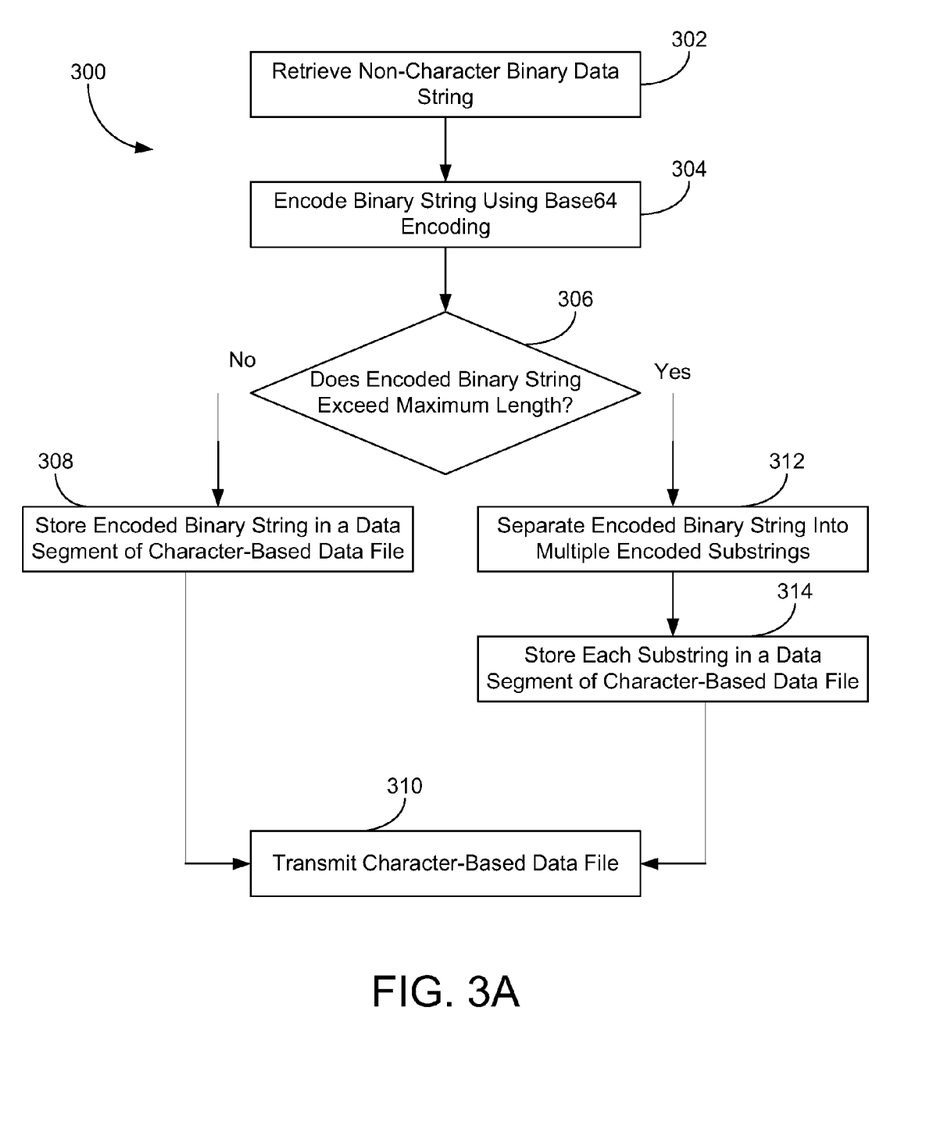
FIG. 3A is a flow diagram of a process for encoding and transmitting a data file using a codepage-independent encoding scheme according to an exemplary embodiment.

Referring now to FIG. 3A, a flow diagram of a process 300 for transmitting non-character binary data within a character-based data file using a codepage-independent encoding scheme (e.g., a Base64 encoding scheme) is shown according to an exemplary embodiment. At step 302, a sending computing system retrieves (e.g., from a memory, via selection by a user, etc.) a non-character binary data string to be transmitted to another system. An encoding module of the sending system encodes the binary string using the Base64 encoding scheme (step 304). The encoding module may be configured to encode the binary string by converting the binary string into its equivalent representation in the Base64 encoding scheme.

The sending system then determines whether the Base64-encoded binary string exceeds a maximum length, if any, associated with data segments of the character-based data file (step 306). If the Base64-encoded binary string does not exceed the maximum length of a data segment, or if there is no maximum data segment length associated with the character-based data file and/or data segments, then the sending system may store the Base64-encoded binary string in a single data segment of the character-based data file (step 308). The sending system may then transmit the character-based data file to another computing system (step 310).

If the Base64-encoded binary string exceeds the maximum length of a data segment, the sending system may separate the encoded binary string into two or more encoded substrings (step 312). The encoded binary string may be separate in a manner such that each substring is no greater than the maximum allowed length of a data segment. In one embodiment, the sending system may determine a minimum number of data segments needed to store the encoded binary string and split the encoded binary string into the determined minimum number of substrings (e.g., in equal or unequal segments). For example, if an encoded binary string is 1,600 bytes and the maximum length of a data segment is 500 bytes, the sending system may determine that four data segments are needed to store the encoded data string. The encoded data string may be separated into four encoded substrings each having a length of 400 bytes. In another embodiment, the sending system may repeatedly separate substrings from the encoded binary string until the entire encoded binary string has been separated into substrings. For example, if an encoded binary string is 1,600 bytes and the maximum length of a data segment is 500 bytes, the sending system may separate a first 500 byte substring from the encoded binary string, leaving 1,100 bytes in the binary string, then a second 500 byte substring, leaving 600 bytes in the binary string, then a third 500 byte substring, leaving 100 bytes in the binary string, and then finally a 100 byte substring.

Once the encoded binary string has been separated into substrings, each of the substrings may be stored in a separate data segment of the character-based data file (step 314). In some embodiments, the sending system may be configured to generate data describing where each encoded substring has been stored (e.g., mapping each substring to a data segment). The data may be stored as part of the character-based data file or as part of another data file (e.g., transmitted with the character-based data file). The mapping data may be used by a receiving system to reconstruct the original Base64-encoded binary string from the substrings. At step 310, the character-based data file may be transmitted to another computer system.

Figure 3B:
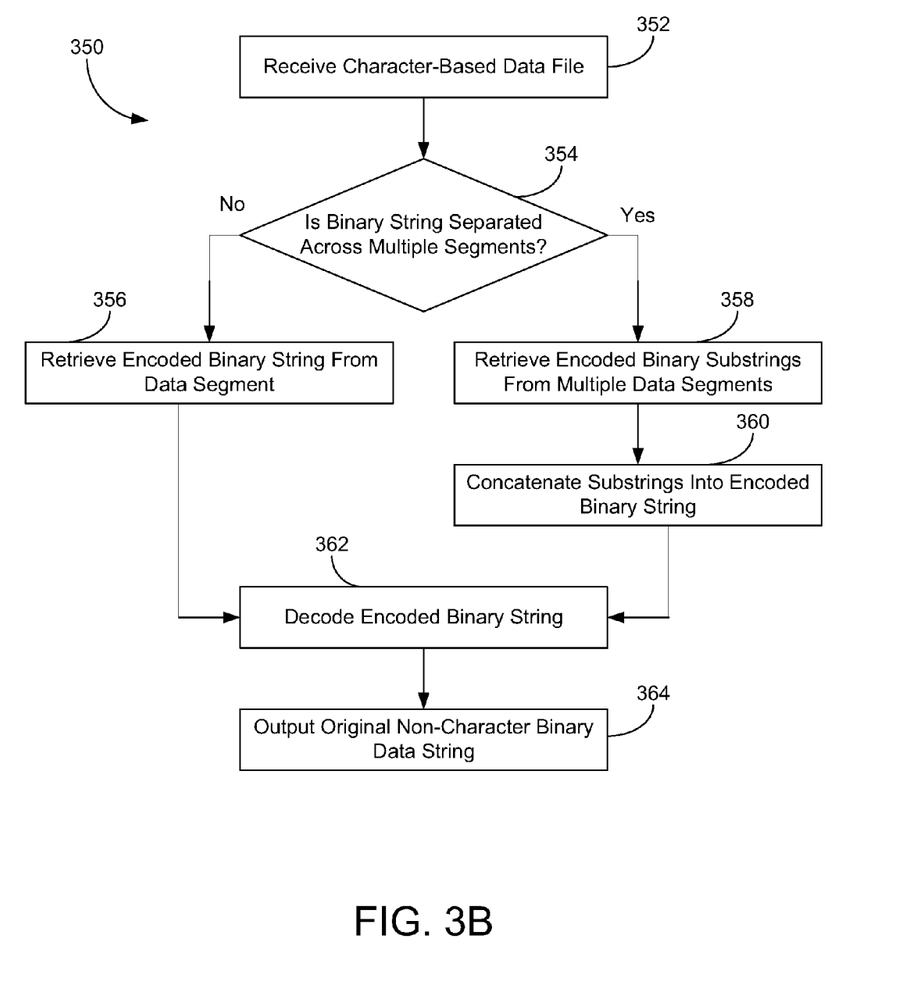
FIG. 3B is a flow diagram of a process for receiving and decoding a data file using a codepage-independent encoding scheme according to an exemplary embodiment.

Referring now to FIG. 3B, a flow diagram of a process 350 for receiving a character-based data file and retrieving and decoding an encoded binary data string using a codepage-independent encoding scheme (e.g., a Base64 encoding scheme) is shown according to an exemplary embodiment. Process 350 may be used, for example, to reconstruct an original non-character binary data string from a character-based data file encoded and transmitted according to a process similar to process 300. At step 352, a receiving computing system may be configured to receive a character-based data file in which at least one encoded binary string has been stored from a sending system. At some point (e.g., at the transmitting system, receiving system, an intervening system, etc.) data segments of the character-based data file may be run on a codepage matching module to account for differences in the character mapping of the codepages of the sending and receiving systems. A codepage matching module should not change any data associated with the encoded binary data string as it has been encoded in a codepage-independent (e.g., Base64) encoding scheme and all characters should be mapped to the same byte values in both systems. In some embodiments, the binary value associated with a character may be altered based on the character encoding scheme utilized by one or both of the sending and receiving systems (e.g., if the receiving system uses a UTF-16 Unicode character encoding scheme, under which each character is represented by two bytes) but the encoding module of the receiving system may be configured to retrieve the same byte values as in the sending system using binary semantics.

At step 354, the receiving system is configured to determine whether the encoded binary string has been separated into multiple substrings stored across multiple data segments (step 354). In some embodiments, the receiving system may determine if the encoded binary string has been split into substrings and/or which substrings have been stored in which segments based on mapping data, as discussed above with respect to FIG. 3A. If the encoded binary string has not been separated across multiple data segments, the receiving system retrieves the encoded binary string from the data segment in which it is stored (step 356).

If the encoded binary string has been separated across multiple data segments, the receiving system may be configured to retrieve each substring of the encoded binary string from the data segment in which it is stored (step 358). The receiving system may be configured to then concatenate the substrings back into the full encoded binary string (step 360).

At step 362, the receiving system is configured to decode the encoded binary string (e.g., using an encoding module of the receiving system). Once the encoded binary string is decoded, the receiving system obtains the original non-character binary string. The receiving system may then output (e.g., store in memory, display to a user, make accessible to a software module, etc.) the original non-character binary string (step 364).

Figure 4A:
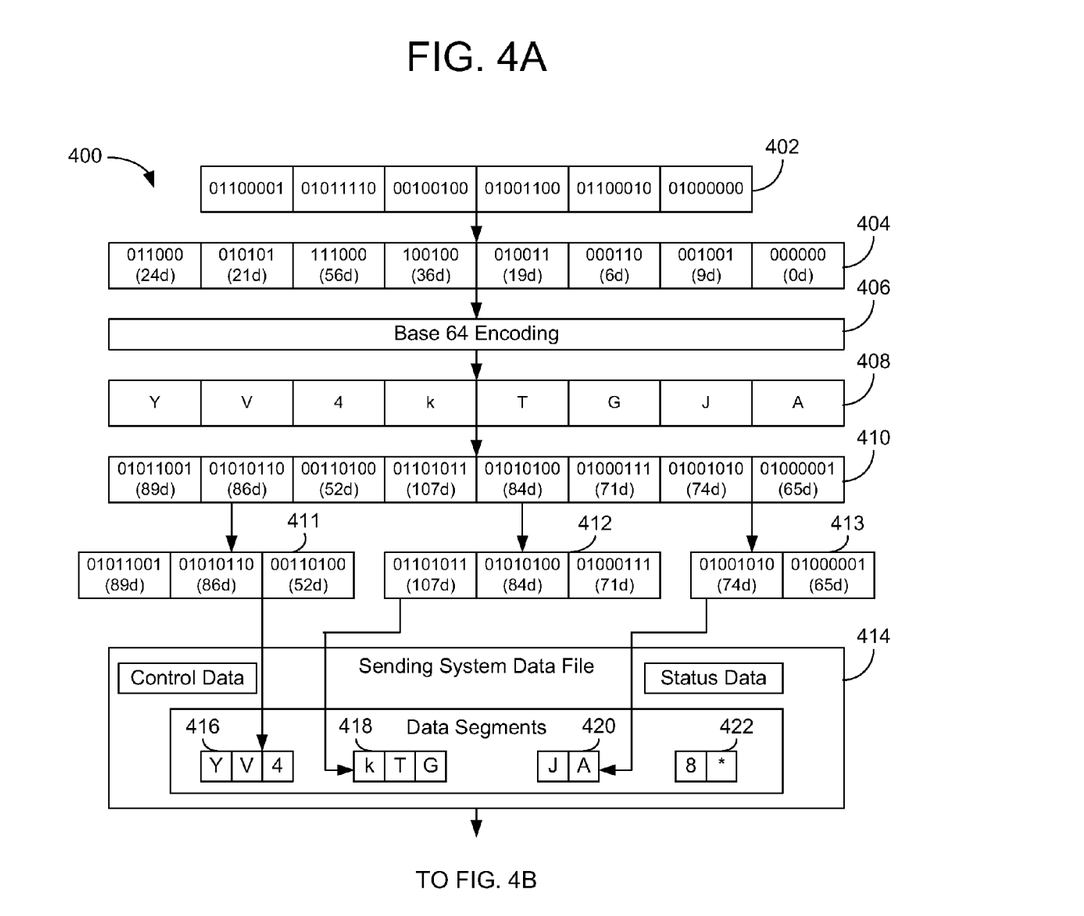
FIGS. 4A and 4B are data flow diagrams illustrating a sample flow of data between two computing systems using a codepage-independent encoding scheme according to an exemplary embodiment.
Figure 4B:
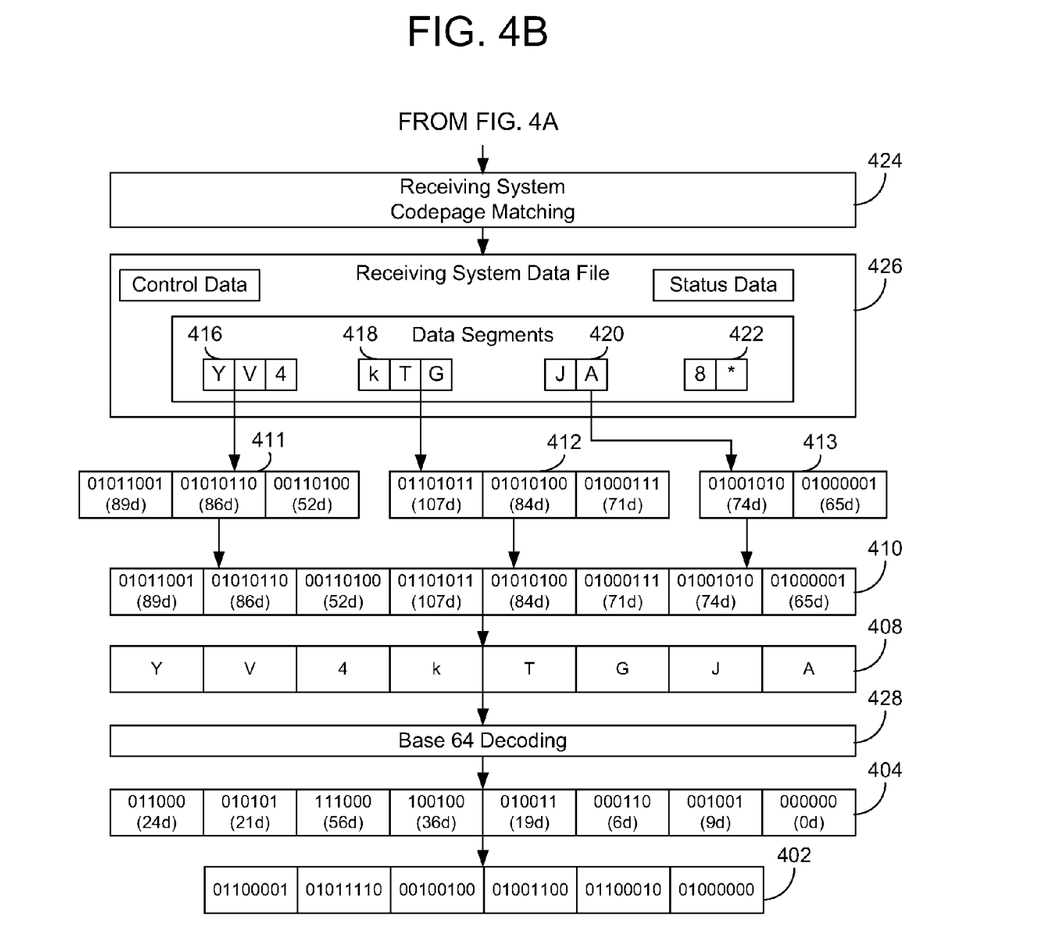

Referring now to FIGS. 4A and 4B, a data flow diagram 400 illustrating a sample flow of data between two computing systems using a Base64 encoding scheme is shown according to an exemplary embodiment. Data flow diagram 400 may represent, for example, the flow of data for a non-character binary string transmitted in a character-based data file from a sending computing system to a receiving computing system utilizing processes 300 and 350. The character-based data file shown in the exemplary embodiment of FIGS. 4A and 4B has a data segment maximum length of three bytes, and each byte represents a single character under the sending and codepage of the receiving systems.

Referring specifically to FIG. 4A, binary string 402 is a non-character binary data string that a user desires to send from one system to another within a character-based data file. The data represented by binary string 402 may be of any type. Binary string 402 includes 48 bits, or six bytes, of data, all of which represents non-character data.

The process of encoding and transmitting binary string 402 begins by separating binary string 402 into six-bit touples 404 (each touple is shown in FIG. 4A according to its binary and decimal representation). Each of the six-bit touples 404 are encoded using a Base64 encoding scheme by an encoding module 406 to determine a Base64-encoded character string 408. The encoded binary string 410 associated with the Base64-encoded character string 408 is determined based on the codepage of the sending system. Because each six-bit touple in binary string 402 is encoded to a Base64-encoded character that is represented under the codepage of the sending system by a full byte (e.g., eight bits), a Base64-encoded binary string (e.g., encoded binary string 410) may occupy a larger memory space than the unencoded binary string.

The sending system then determines whether encoded binary string 410 exceeds the maximum length of the data segment. Encoded binary string 410 is eight bytes long, and the maximum length of the data segment, as noted above, is three bytes. Accordingly, the sending system separates encoded binary string 410 into three encoded binary substrings 411, 412, and 413. Encoded binary substrings 411, 412, and 413 are stored in data segments 416, 418, and 420, respectively, of a character-based data file 414 stored on the sending system. Character-based data file 414 may also have one or more data segments storing data intended to represent character data (i.e., not storing non-character binary data), such as data segment 422. Character-based data file 414 may then be sent to a receiving system.

Referring now to FIG. 4B, character-based data file 414 is received at the receiving system and processed using codepage matching module 424. The resulting character-based data file 426 is stored in the receiving system. In some embodiments, the binary data representing the data stored in data segment 422 may change as a result of the codepage matching process. For example, the character string "8*" stored in data segment 422 may have been represented under the sending system codepage with the binary string 00111000 01101111. However, under the receiving system codepage, the same character string may now be represented by the binary string 00111000 01001001. No such alterations are made to encoded binary substrings 411, 412, and 413 stored in data segments 416, 418, and 420, respectively, because these substrings are encoded in as Base64 encoding scheme including characters that are represented by the same bit and/or byte values under different codepages.

The receiving system retrieves encoded binary substrings 411, 412, and 413 from data segments 416, 418, and 420 of the character-based data file. The receiving system then concatenates encoded binary substrings 411, 412, and 413 to form the full encoded binary string 410. The Base64-encoded character string 408 represented by encoded binary string 410 is determined according to the receiving system codepage, and should be determined in the same manner as in the receiving system as Base64 encoding includes characters that are mapped to the same binary/decimal values in many different codepages. Encoded binary string 410 and/or Base64-encoded character string 408 is then decoded using the same Base64 encoding scheme by an encoding module 428 of the receiving system. Once encoded binary string 410 has been decoded, the receiving system recovers the six-bit touples 404 associated with the original binary string 402 and can reconstruct binary string 402.

In the exemplary embodiments described with reference to FIGS. 3A, 3B, and 4, each of the data segments stored in the original data file was encoded using a codepage-independent encoding scheme. In some embodiments, one or more data segments may be transmitted without being encoded. In such embodiments, the data file may include data indicating which data segments are encoded in the codepage-independent encoding scheme and/or which data segments are not encoded (e.g., in control data, status data, a portion of the data segments, etc.). For example, in one embodiment, a data file may contain five data segments, three of which are encoded using the encoding scheme and two of which are transmitted without being encoded. In some embodiments, the unencoded data segments may be matched between codepages using a codepage matching module.

The embodiments of the present disclosure have been described with reference to drawings. The drawings illustrate certain details of specific embodiments that implement the systems and methods and programs of the present disclosure. However, describing the invention with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium (e.g., non-transitory medium) which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, an optical disk drive for reading from or writing to a removable optical disk such as a CD ROM or other optical media, flash media (e.g., USB flash memory, Compact Flash, Secure Digital, solid state drives, etc.), etc. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments of the disclosure has been presented for purposes of illustration and description. It is not intended to be exhaustive or limiting to the precise form disclosed, and modifications and variations are possible in light of the above teachings or may be acquired from practice. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

The exemplary embodiments illustrated in the figures and described above are offered by way of example only. Other embodiments may include, for example, structures with different data mapping or different data. The disclosure is not limited to a particular embodiment, but extends to various modifications, combinations, and permutations that nevertheless fall within the scope and spirit of the appended claims.

What is claimed is:

1. A method of processing binary data for transmission from a first computing system to one or more other computing systems within a character-based data file, the method comprising:
   receiving, at the first computing system, a binary data string to be stored within the character-based data file, wherein at least a portion of the binary data string represents data other than character data;
   encoding, using an encoding module of the first computing system the binary data string using a codepage-independent encoding scheme, wherein the encoding module is implemented using instructions that are executable by one or more processors and stored in one or more non-transitory computer-readable media; and storing the encoded binary data string in one or more of a plurality of data segments of the character-based data file, wherein the character-based data file is configured such that all data stored in the plurality of data segments is indicated as representing character data.

2. The method of claim 1, wherein the codepage-independent encoding scheme is a Base64 encoding scheme.

3. The method of claim 1, further comprising transmitting the character-based data file containing the encoded binary data string from the first computing system to a second computing system.

4. The method of claim 1, wherein each data segment has associated therewith a maximum length of data it may store, wherein storing the encoded binary data string in one or more of a plurality of data segments of the character-based data file comprises separating the encoded binary data string into a plurality of encoded binary data substrings and storing each of the encoded binary data substrings in a separate data segment.

5. The method of claim 4, wherein the character-based data file is an SAP IDoc.

6. The method of claim 1, wherein the character-based data file comprises at least one data segment that contains data representing character data.

7. The method of claim 1, wherein the character-based data file is configured such that each byte stored in the data segments is interpreted as a single character.

8. The method of claim 1, wherein each of the plurality of data segments includes a segment type configured to identify a format of the data segment.

9. A system for processing binary data received at a computing system within a character-based data file, the system comprising:
   one or more processors; and
   one or more non-transitory computer-readable media having instructions stored thereon, the instructions being executable by the one or more processors to implement a method comprising:
      receiving the character-based data file, the character-based file having a plurality of data segments, wherein the character-based data file is configured such that all data stored in the plurality of data segments is interpreted by the computing system to represent character data;
      retrieving an encoded binary data string from at least one of the plurality of data segments, the encoded binary data string being encoded using a codepage-independent encoding scheme; and
      decoding the encoded binary data string using the codepage-independent encoding scheme, wherein at least a portion of the unencoded binary data string represents data other than character data.

10. The system of claim 9, wherein the codepage-independent encoding scheme is a Base64 encoding scheme.

11. The system product of claim 9, wherein the method further comprises storing the unencoded binary data string in a memory of the computing system.

12. The system of claim 9, wherein each data segment has associated therewith a maximum length of data it may store, wherein retrieving the encoded binary data string from at least one of the plurality of data segments comprises retrieving a plurality of encoded binary data substrings from two or more of the plurality of data segments and concatenating the encoded binary data substrings to form the encoded binary data string.

13. The system of claim 9, wherein the character-based data file is an SAP IDoc.

14. The system of claim 9, wherein the character-based data file is configured such that the computing system interprets each byte stored in the data segments as a single character.

15. The system of claim 9, wherein each of the plurality of data segments includes a segment type configured to identify a format of the data segment.

16. A program product comprising one or more non-transitory computer-readable media having instructions stored thereon, the instructions being executable by one or more processors to implement a method of processing binary data for transmission from a first computing system to one or more other computing systems within a character-based data file, the method comprising:
   receiving a binary data string to be stored within the character-based data file, wherein at least a portion of the binary data string represents data other than character data;
   encoding the binary data string using a Base64 encoding scheme;
   separating the Base64-encoded binary data string into a plurality of Base64-encoded binary data substrings based on a maximum length associated with each of a plurality of data segments of the character-based data file; and
   storing each Base64-encoded binary data substring in one of the data segments, wherein the character-based data file is configured such that all data stored in the plurality of data segments is indicated as representing character data, wherein each of the plurality of data segments includes a segment type configured to identify a format of the data segment.

17. The program product of claim 16, wherein the method further comprises transmitting the character-based data file containing the Base64-encoded binary data substrings from the first computing system to a second computing system.

18. The program product of claim 16, wherein the character-based data file is an SAP IDoc.

19. The program product of claim 16, wherein the character-based data file comprises at least one data segment that contains data representing character data.

20. The program product of claim 16, wherein the character-based data file is configured such that the each byte stored in the data segments is interpreted as a single character.

* * * * *